United States Patent [19]
Cohen et al.

[11] Patent Number: 5,892,931
[45] Date of Patent: *Apr. 6, 1999

[54] METHOD AND APPARATUS FOR SPLITTING A BUS TARGET RESPONSE BETWEEN TWO DEVICES IN A COMPUTER SYSTEM

[75] Inventors: Debra T. Cohen; Sung-Soo Cho, both of Sunnyvale; Chao-Hsin Chi, San Jose; David Chang, Daly City, all of Calif.

[73] Assignee: Intel Corporation, Santa Clara, Calif.

[ * ] Notice: The term of this patent shall not extend beyond the expiration date of Pat. No. 5,748,918.

[21] Appl. No.: 810,690

[22] Filed: Feb. 28, 1997

Related U.S. Application Data

[63] Continuation-in-part of Ser. No. 673,450, Jun. 28, 1996, Pat. No. 5,748,918.

[51] Int. Cl.[6] .............................. G06F 12/02; G06F 13/38
[52] U.S. Cl. ......................... 395/309; 395/306; 395/308; 395/281
[58] Field of Search ...................................... 395/281, 284, 395/306, 308, 822, 309, 200.38, 200.39

[56] References Cited

U.S. PATENT DOCUMENTS

| | | | |
|---|---|---|---|
| 5,467,295 | 11/1995 | Young et al. | 395/200.38 |
| 5,621,900 | 4/1997 | Lane et al. | 395/281 |
| 5,715,411 | 2/1998 | Verdun | 395/309 |

*Primary Examiner*—Meng Ai T. An
*Assistant Examiner*—Rupal D. Dharia
*Attorney, Agent, or Firm*—Blakely, Sokoloff, Taylor & Zafman

[57] ABSTRACT

The present invention provides a method and apparatus for splitting a bus target response between two devices in a computer system. In one embodiment, the computer system includes a bus having a first signal line and a second signal line, a third signal line, and two agents coupled to the bus and the third signal line. The first agent claims to be a target of a transaction on the bus without decoding the address associated with the transaction by asserting the first signal on the first signal line. The second agent responds to the transaction as the target. The second agent thereafter asserts a third signal on the third signal line to coordinate deassertion of the first signal on the first signal line by the first agent and concurrent assertion of the second signal on the second signal line by the second agent.

26 Claims, 9 Drawing Sheets

METHOD AND APPARATUS FOR SPLITTING A BUS TARGET RESPONSE BETWEEN TWO DEVICES IN A COMPUTER SYSTEM

This is a continuation-in-part of a U.S. patent application entitled "Method and Apparatus for Supporting Two Subtractive Decode Agents on the Same Bus in a Computer System" filed on Jun. 28, 1996 (application Ser. No. 08/673,450) now U.S. Pat. No. 5,748,918.

1. Field of the Invention

The invention relates to the field of computer systems and, in particular, to the field of splitting a bus target response between two devices in a computer system.

BACKGROUND OF THE INVENTION

2. Description of Related Art

Generally, bus transactions in computer systems involve a "master" and a "target". The master is the bus agent that initiates the transaction, and the target is the bus agent that responds to or is selected by the transaction. If the bus protocol requires a determination of which agent is the target of a particular transaction, that determination can be centralized or distributed. When target determination is distributed, the target itself is responsible for claiming the transaction.

The protocol of the Peripheral Component Interconnect (PCI) bus includes distributed target determination (PCI Local Bus Specification, Revision 2.1, published July 1995). Bus masters initiate transactions by asserting the FRAME# signal and driving the address of the transactions onto AD lines. Normally, each transaction has one target, so one and only one agent on the bus has a responsibility to respond to the transaction as the target. That agent claims the responsibility to respond to the transaction by asserting the DEVSEL# signal. The responsibility to respond to the transaction includes a responsibility to assert the TRDY# signal to indicate that the target is ready to complete the transaction and either a responsibility to provide or accept data, depending on whether the transaction is a read or a write.

To determine which agent should claim a transaction, potential target agents decode the address to determine if they are the actual target. Potential target agents that perform such a decode operation are commonly referred to as "positive" decode agents. Assuming that no two targets reside at the same address, no more than one positive decode agent will claim the transaction. By limiting the amount of time available for address decoding, the PCI bus protocol allows a potential target agent to claim transactions without performing a decode by claiming any transaction that is not claimed by a positive decode agent after a finite period of time. Such an agent is commonly referred to as a "subtractive" decode agent. To prevent target conflicts, the prior art allows only one agent on the bus to implement a subtractive decode.

This limitation, which prevents the use of multiple subtractive decode agents on a bus, presents a problem in a system with multiple PCI buses. For example, FIG. 1 shows a system with PCI bus 101 and PCI bus 102 connected by PCI bridge 103. Bridge 103 transfers signals between buses with a delay of two clock periods. Agent 104 resides on bus 101, and is a positive decode agent requiring two clock periods for decoding. Agents 105, 106, and 107 reside on bus 102. Agent 105 is the slowest positive decode agent on bus 102, requiring three clock periods for decoding. Therefore, when agent 105 is targeted, it will claim the transaction on the third clock after the transaction is initiated. Agent 106 is the subtractive decode agent of bus 102, claiming all unclaimed transactions on the fourth clock after initiation of the transaction.

Referring to the timing diagram of FIG. 2 along with FIG. 1, assume that at time 201 agent 107 initiates a transaction that targets agent 104. Due to the delay across bridge 103, the address of the transaction is driven on bus 101 two clock periods after the address is driven on bus 102. Therefore, agent 104 begins decode at time 203, two clock periods after the transaction is initiated. Agent 104 completes decode at time 205, four clock periods after the transaction is initiated, and asserts the DEVSEL# signal on bus 101 to claim the transaction. The DEVSEL# signal is transferred across bridge 103, resulting in the assertion of the DEVSEL# signal on bus 102 at time 207. However, agent 106 will have already mistakenly claimed the transaction at time 205, four clock periods after the transaction was initiated.

One possible solution to this problem might be to increase the finite time period allowed for positive decode. However, that solution would violate the bus protocol, which allows only three clock periods for positive decode, as well as decrease performance by increasing the latency of transactions to the subtractive decode agent. Another possible solution might involve reducing the delay across bridge 103 and restricting the decode time of all agents on bus 101. However, that solution would require performance improvements to bridge 103 and certain agents on bus 101, and decrease flexibility of bus 101 by excluding slow decode agents. Another possible solution might be to require bridge 103 to act as a positive decode agent on bus 102 on behalf of all agents on bus 101. However, that solution would add complexity to bridge 103, as well as decrease flexibility of bus 101 by limiting the available address space and device configuration model to that which can be accommodated by bridge 103.

The present invention overcomes the problems of the prior art described above by providing support for two subtractive decode agents on the same bus in a computer system.

SUMMARY OF THE INVENTION

The present invention provides a method and apparatus for splitting a bus target response between two devices in a computer system. In one embodiment, the computer system includes a bus having a first signal line and a second signal line, a third signal line, and two agents coupled to the bus and the third signal line. The first agent claims to be a target of a transaction on the bus without decoding the address associated with the transaction by asserting the first signal on the first signal line. The second agent responds to the transaction as the target. The second agent thereafter asserts a third signal on the third signal line to coordinate deassertion of the first signal on the first signal line by the first agent and concurrent assertion of the second signal on the second signal line by the second agent.

DESCRIPTION OF THE PREFERRED EMBODIMENT

A method and apparatus for splitting a bus target response between two devices in a computer system is described. In the following description, numerous specific details are set forth, such as specific bus protocols and signal names, in order to provide a thorough understanding of the present invention. However, it will be apparent to one skilled in the art that the present invention can be practiced without these specific details. In other instances, some details have been omitted in order to avoid obscuring the present invention.

Figure 1:
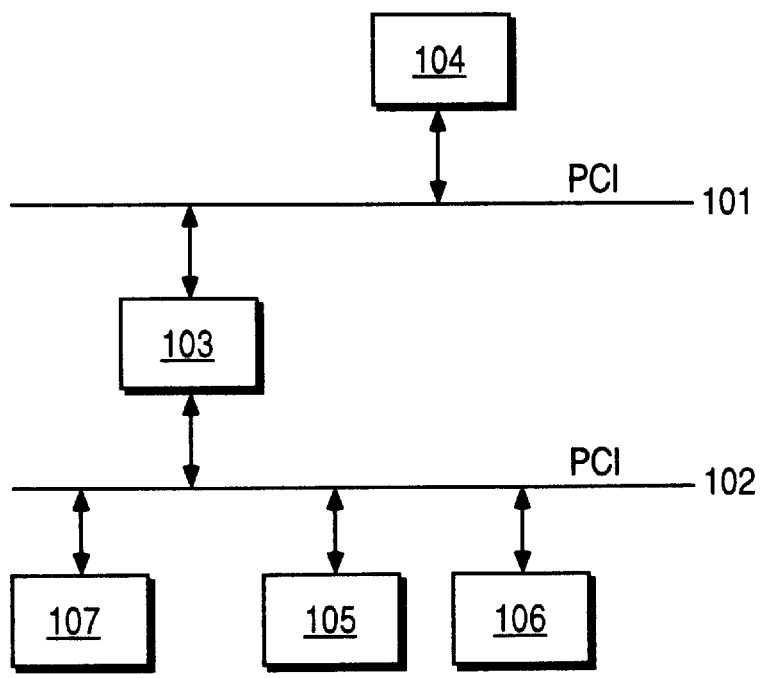
FIG. 1 is a block diagram of a prior art system with two PCI buses and one subtractive decode agent.
Figure 2:
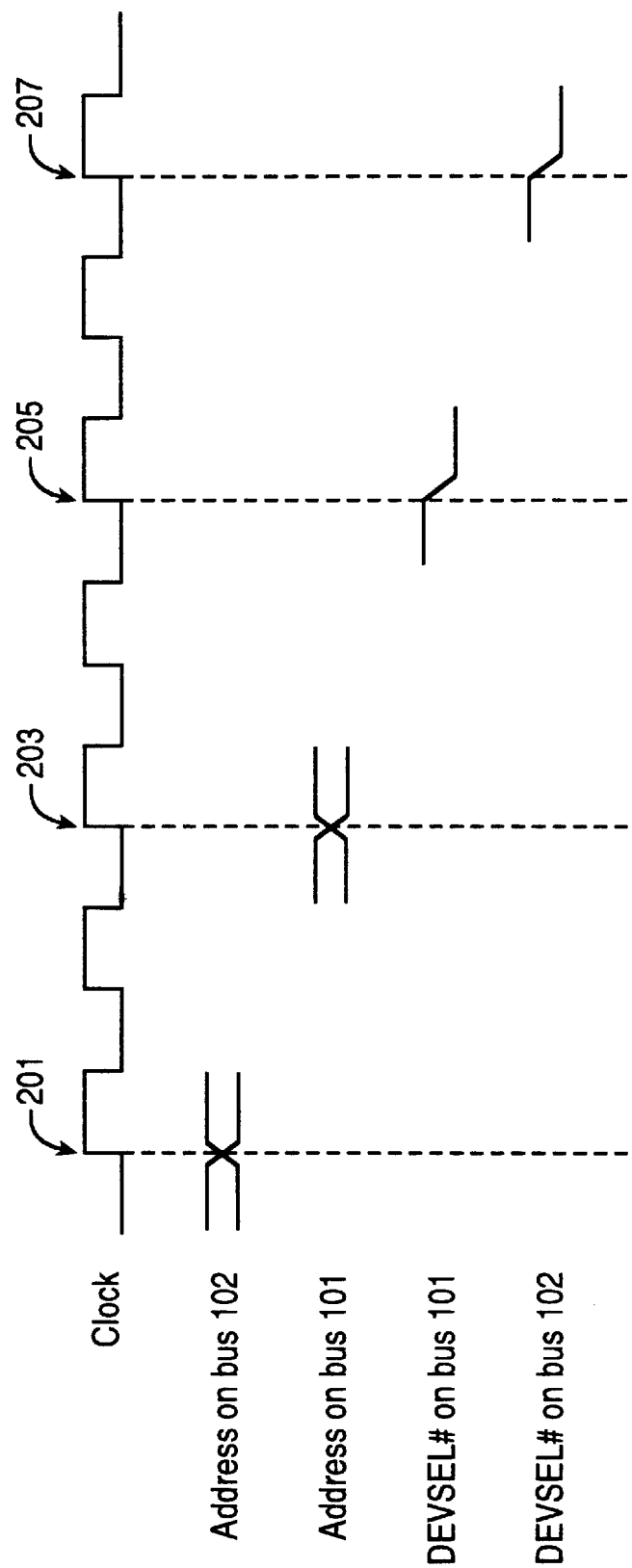
FIG. 2 is a timing diagram illustrating a problem with the prior art system of FIG. 1.
Figure 3A:
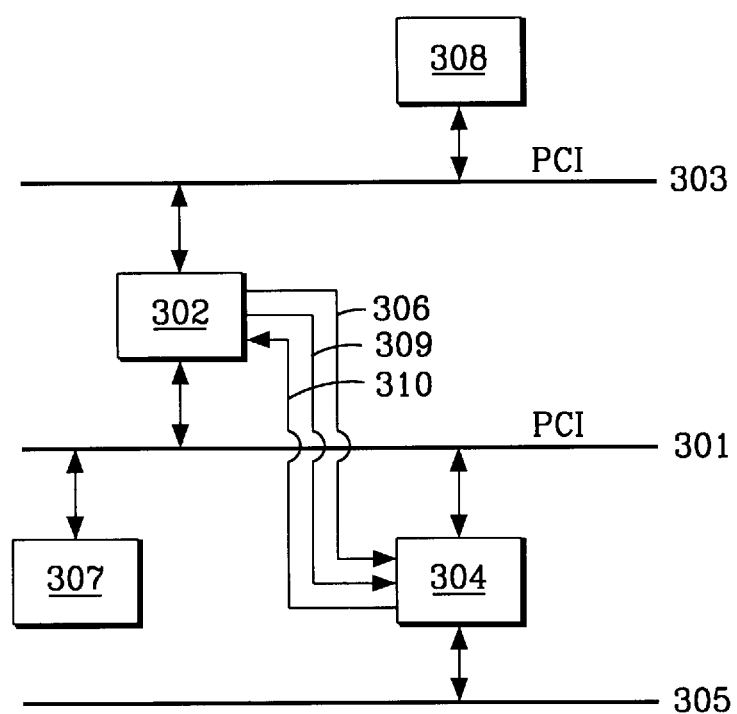
FIG. 3A is a block diagram of one embodiment of the computer system of the present invention.

FIG. 3A is a block diagram of one embodiment of the computer system of the present invention. The computer system of FIG. 3A has three buses, 301, 303, and 305, and four agents, 302, 304, 307, and 308. However, the computer system can have any number of buses greater than zero and any number of agents greater than one within the scope of the present invention. An agent is any device coupled to a bus, for example a memory controller, an input/output controller, or a bus bridge. Bus 301 can be any type of bus that follows a protocol in which the targets claim transactions. The Peripheral Component Interconnect (PCI) bus is one example of such a bus (PCI Local Bus Specification, Revision 2.1, published July 1995).

Agent 302 is a subtractive decode agent residing on bus 301. In this embodiment, subtractive decode agent 302 is a bridge to another bus. One advantage of implementing a bus bridge as a subtractive decode agent is that when a transaction is initiated on one bus, the bridge does not have to perform a positive decode on behalf of all of the agents that reside on the other bus. Such a positive decode would almost certainly be slow and costly given the likelihood that the bus will have a large, fragmented, and possibly dynamic address space. Agent 302 is shown as a bridge to bus 303. However, agent 302 could be any other type of subtractive decode agent within the scope of the present invention.

Agent 304 is a second agent residing on bus 301. To illustrate one advantage of the present invention, agent 304 is shown in FIG. 3A as a bridge to bus 305. For the reason explained above, it would be advantageous to implement agent 304 as a subtractive decode agent. However, to implement bridge 304 as a true subtractive decode agent would result in a target conflict between agents 302 and 304 any time that a transaction was not claimed by a positive decode agent on bus 301.

By definition both agent 304 and bridge 302 cannot behave as subtractive decode agents. However, the present invention allows both agent 304 and agent 302 to behave as subtractive decode agents through the use of the NOGO signal on signal line 306. The NOGO signal indicates whether the responsibility to respond to a transaction is to be transferred from one agent (e.g., agent 302) to another agent (e.g., agent 304). A signal line is defined broadly as a communication path using any medium such as an electronic wire, a fiber-optic line, a light beam (e.g., IR light beam), radio frequency signaling, and the like.

Figure 4:
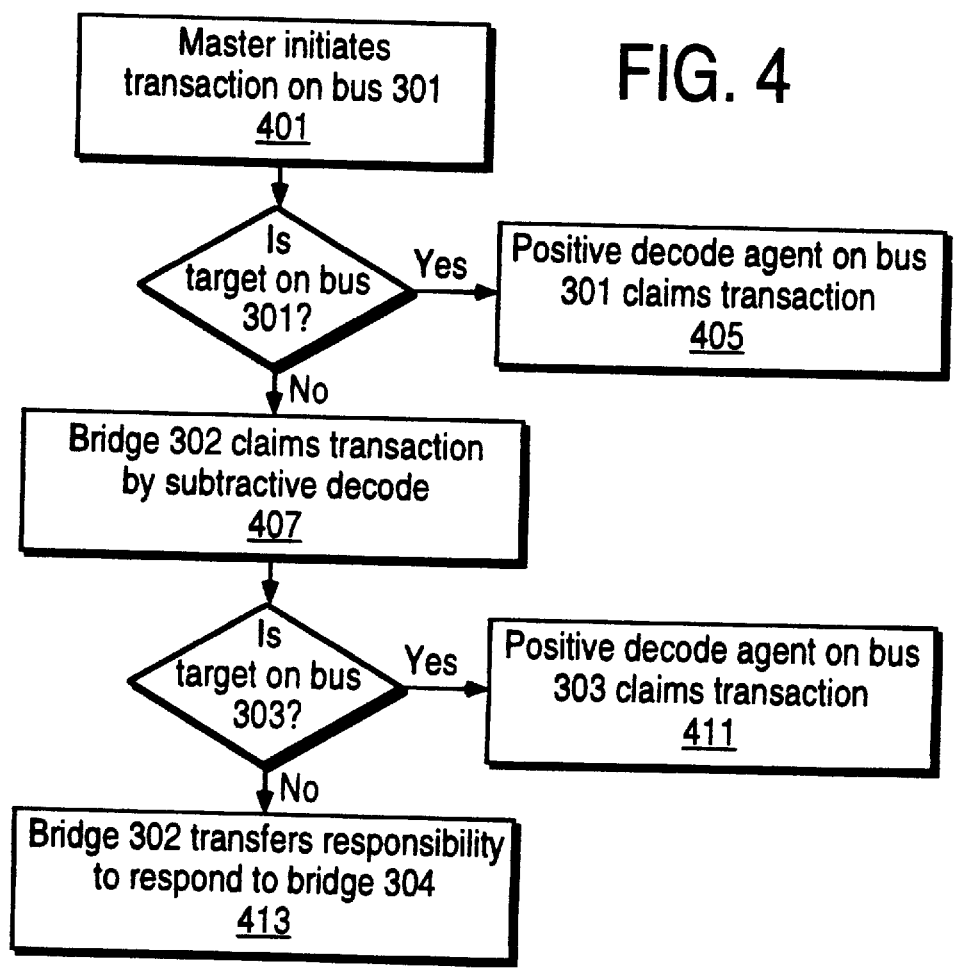
FIG. 4 is a flow diagram illustrating the use of the NOGO signal in determining the target of a bus transaction according to one embodiment of the present invention.

FIG. 4 illustrates the use of the NOGO signal. Assume that buses 301 and 303 are PCI buses. In step 401, master agent 307 initiates a transaction on bus 301 that could be targeted to an agent on bus 301, bus 303, or bus 305. If the transaction is targeted to an agent on bus 301, that agent performs a positive decode and claims the transaction in step 405. However, if the transaction is not claimed by positive decode on bus 301, agent 302 claims the transaction by subtractive decode in step 407, and forwards the transaction to bus 303. Then, if the transaction is targeted to an agent on bus 303, that agent performs a positive decode and claims the transaction on bus 303 in step 411, causing agent 302 to retain the responsibility to respond to the transaction on bus 301. In that case it is appropriate that agent 304 did not claim the transaction by subtractive decode. However, if no agent on bus 303 claims the transaction, then by the process of elimination, the target of the transaction must reside on bus 305. In that case agent 304, not agent 302, should be responsible for responding to the transaction on bus 301. Therefore, in step 413, agent 302 uses the NOGO signal to transfer the responsibility to respond to agent 304. Agent 304 tracks the transaction from step 401 to step 413 in preparation to respond, including latching of the address and bus command signals if necessary. Then, in step 413, agent 304 samples the NOGO signal on signal line 306 to determine whether or not agent 304 should respond to the transaction.

Figure 3B:
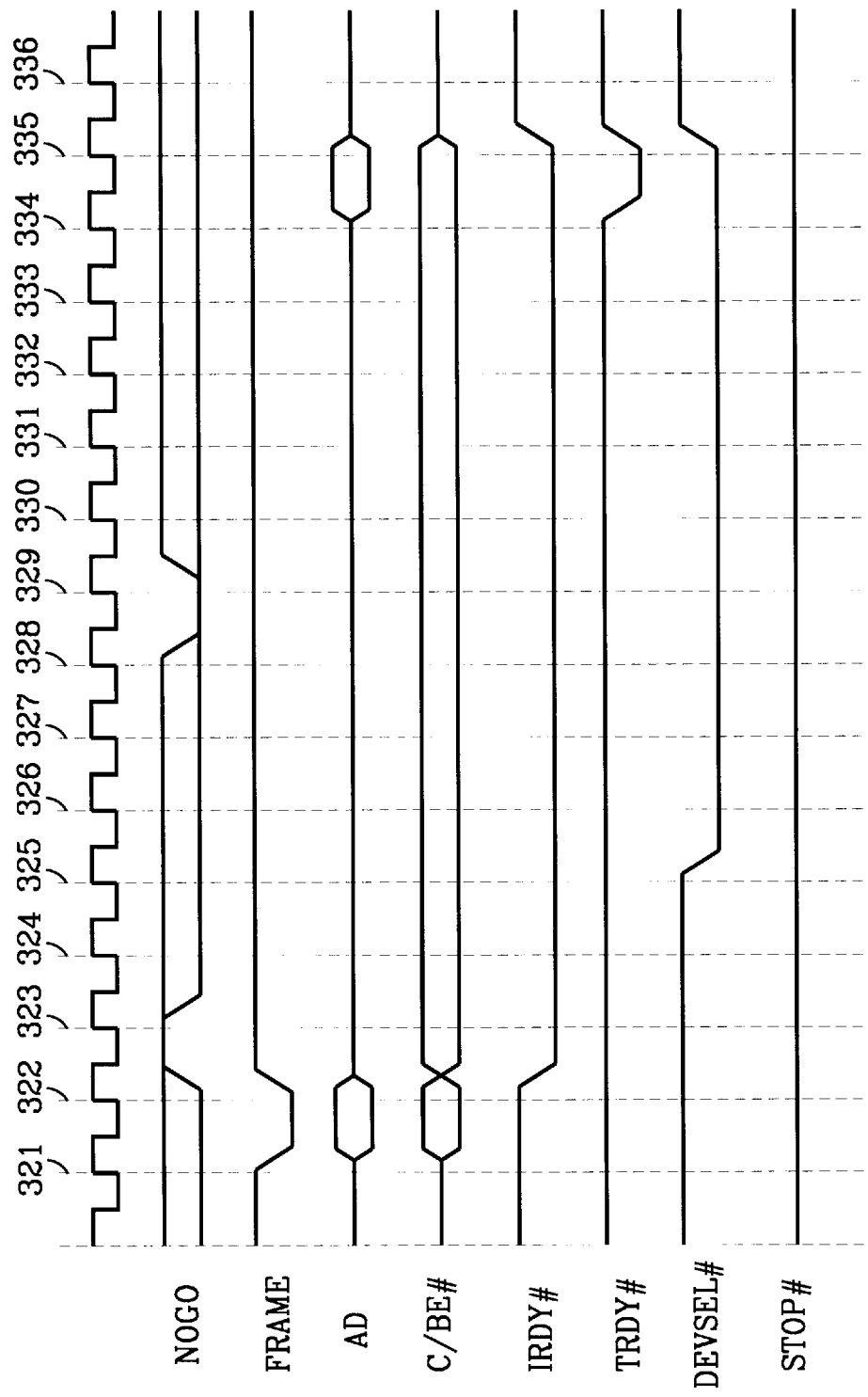
FIG. 3B is a timing diagram illustrating an implementation in which a bus target response is split between two agents.

In one embodiment of the present invention wherein bus 301 is a PCI bus, transfer of the responsibility to respond means that agent 304, not agent 302, asserts the TRDY# signal to indicate that the target is ready to complete the transaction and provides or accepts data depending on whether the transaction is a read or a write. FIG. 3B is a timing diagram illustrating an implementation in which a bus target response is split between two agents. Referring to FIGS. 3A and 3B, agent 307 initiates a transaction targeted for an agent on bus 305 by asserting FRAME# and placing an address on the AD (Address and Data) bus at time 321. At time 322, agent 307 asserts IRDY# specifying that it is ready to complete the data phase of the present transaction. However, since the transaction is not claimed by positive decode on bus 301, agent 302 claims the transaction by subtractive decode and asserts DEVSEL# at time 325. Agent 302 forwards the transaction to bus 303, which has a delay of two clock periods. Since no agent on bus 303 claims the transaction by time 327 (i.e., 6 clock periods after agent 307 initiates the transaction), agent 302 knows that the target must reside on bus 305. Accordingly, at time 328, agent 302 asserts the NOGO signal to transfer the responsibility to respond to agent 304. However, agent 302 continues to be responsible for asserting DEVSEL# until the end of the transaction. At time 329, agent 304 forwards the transaction to bus 305. At time 334, agent 304 responds to the transaction by asserting TRDY# and placing valid data on the AD bus for agent 307 to sink (read). Finally, at time 335, agent 307 deasserts IRDY#, agent 302 deasserts DEVSEL#, and agent 304 deasserts TRDY# to indicate the end of the transaction.

In another embodiment of the present invention, also wherein bus 301 is a PCI bus, transfer of the responsibility to respond also includes transfer from agent 302 to agent 304 of the responsibility to assert the DEVSEL# signal. In this embodiment, agent 302 claims the transaction by subtractive decode and initially asserts DEVSEL# at time 325. At time 328, agent 302 asserts the NOGO signal to transfer the responsibility to respond to agent 304. At time 328, agent 302 also stops driving DEVSEL# and allows agent 304 to drive it instead. Accordingly, agent 304 becomes responsible for deasserting DEVSEL# in addition to deasserting TRDY# at time 335. However, if the DEVSEL# driving control is turned over from agent 302 to agent 304, there must not be a turnaround cycle in which neither agent drives it. That is, DEVSEL# must be asserted continuously (albeit by two agents) until the end of the transaction. In an alternative embodiment, agent 302 not only drives DEVSEL# but also initially drives TRDY# and STOP# up until a predetermined turnaround time, at which point, agent 302 turns over control of TRDY#, STOP#, and possibly DEVSEL# over to agent 304. However, agent 302 must not assert the TRDY# and STOP# signals (i.e., agent 302 must drive the signals to their inactive state). For example, at time 325, agent 302 asserts the DEVSEL# signal and also drives the TRDY# and STOP# signals to their inactive states and at time 328 turns over control of TRDY#, STOP#, and DEVSEL# (optional) to agent 304. Turning over driving control of the TRDY# and STOP# signals from agent 302 to agent 304 may be accomplished with or without a turnaround cycle (i.e., a bus cycle used to prevent bus contention). The turnaround cycle is seamless, since the signals are driven high by agent 302, then left to float high, and then driven by agent 304.

In either embodiment, the transfer of the responsibility to respond is transparent to master agent 307. Master agent 307 samples the DEVSEL# and TRDY# signals to determine the status of the target, but master agent 307 neither knows nor cares if the DEVSEL# and TRDY# signals are asserted by the same agent or by different agents. In an embodiment of the present invention wherein bus 301 is not a PCI bus, the responsibility to respond and the transfer of that responsibility would be defined according to the bus protocol.

The PCI target abort protocol involves the deassertion of DEVSEL# and the concurrent (in the same clock period) assertion of STOP#. For example, the PCI specification requires the target of a cycle to target abort an I/O cycle if the low-order two bits on the AD lines during the address phase do not match the byte enables on C/BE# during the data phase. Referring to FIGS. 3A and 3B, agent 302 will know by time 324 whether a target abort condition exists by examining the lower-order two bits of the AD lines during the address phase and the byte enables during the data phase of an I/O cycle. If agent 302 subtractively claims the transaction at time 325 by asserting DEVSEL# and a target abort condition exists, agent 302 can target abort the cycle at time 326 or any time thereafter by concurrently deasserting DEVSEL# and asserting STOP# since it has control of both signals.

In another implementation, an agent may not have control of both DEVSEL# and STOP# to target abort a transaction. However, the present invention allows for two agents to target abort a transaction through the use of a T_ABORT signal via signal line 310. The T_ABORT signal is asserted by a first agent and indicates to a second agent to target abort a transaction in a predetermined number of clock period(s). The T_ABORT signal may be active low or active high. However, in the present implementation, the T_ABORT signal is active low.

FIG. 3A illustrates the use of signal line 310. Referring to FIGS. 3A and 3B, assume that agent 307 initiates a transaction targeted to an agent on bus 305. Agent 307 asserts the FRAME# signal at time 321. At time 325, agent 302 subtractively claims the transaction by asserting DEVSEL# and at time 328 transfers the responsibility to respond to agent 304 by asserting the NOGO signal but retains the responsibility to keep DEVSEL# asserted until the end of the transaction. If agent 304 decides to target abort a transaction under arbitrary conditions which are only visible to it and not agent 302 (e.g., fatal error on bus 305), then agent 304 asserts the T_ABORT signal on signal line 310, indicating to agent 302 to target abort the transaction. Thus, at a predetermined clock period(s) thereafter (e.g., one, two, etc.), agent 302 deasserts DEVSEL# and agent 304 concurrently asserts STOP#. As such, the T_ABORT signal allows two agents to target abort a transaction. It must be noted that if agent 302 also turns over control of DEVSEL# to agent 304, then agent 304 does not need to coordinate a target abort with agent 302 because it controls both DEVSEL# and STOP#.

In another embodiment of the computer system of the present invention, in step 401 of FIG. 4 the transaction on bus 301 is initiated by agent 304 instead of agent 307. In this embodiment it is possible for agent 304 to initiate as the master and respond as the target of the same transaction on bus 301. Therefore, agent 304 can be the master of a transaction without requiring agent 304 to determine where the target resides. Agent 304 initiates the transaction on bus 301, and if the target is on bus 305 the responsibility to respond will be transferred to agent 304 by agent 302.

Thus, the present invention provides for two agents to be coupled to one bus without requiring either agent to implement a positive decode. The present invention also provides for two agents to behave as subtractive decode agents on bus 301, albeit at different times. This aspect of the present invention involves the use of the MT (master type) signal on signal line 309 between agents 302 and 304.

Figure 5:
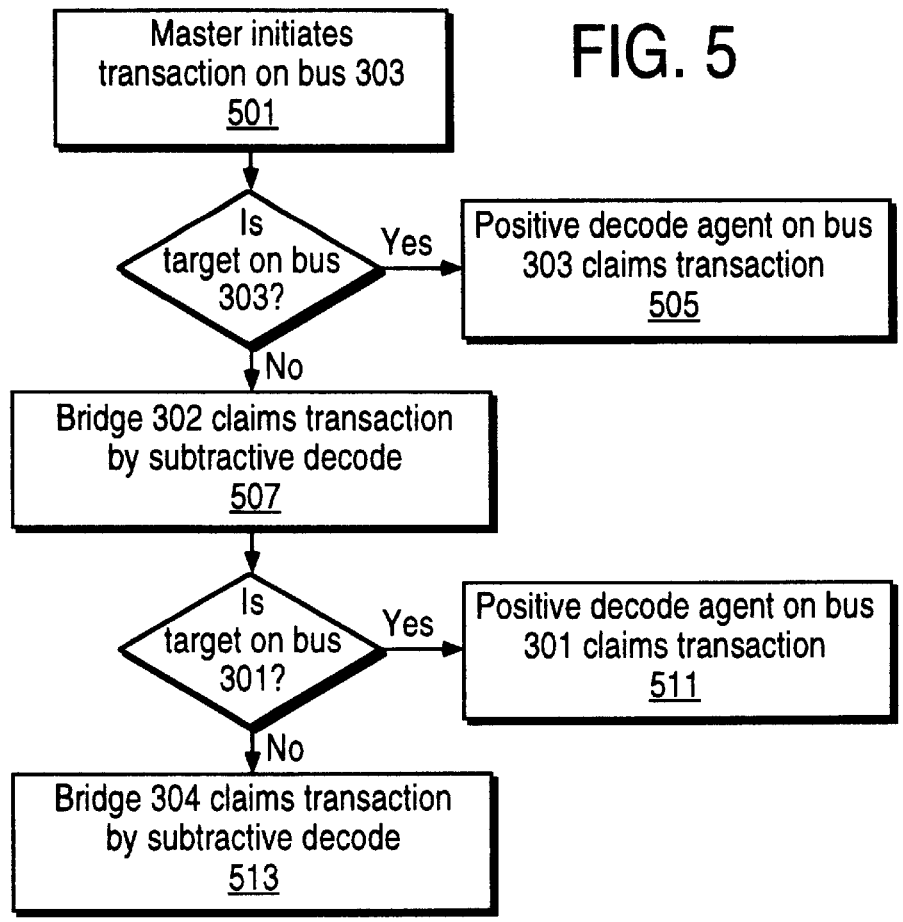
FIG. 5 is a flow diagram illustrating the use of the MT signal in determining the target of a bus transaction according to one embodiment of the present invention.

FIG. 5 illustrates the use of the MT signal. In step 501 of FIG. 5, master agent 308 initiates a transaction on bus 303 that could be targeted to an agent on bus 301, bus 303, or bus 305. If the transaction is targeted to an agent on bus 303, that agent performs a positive decode and claims the transaction in step 505. However, if the transaction is not claimed by positive decode on bus 303, agent 302 claims the transaction by subtractive decode in step 507, and forwards the transaction to bus 301. In this case, agent 302 remains the subtractive decode agent on bus 303. However, behaving as the subtractive decode agent on bus 303 does not require agent 302 to behave as the subtractive decode agent on bus 301. Furthermore, there is no need for agent 302 to behave as the subtractive decode agent on bus 301, because there is no need for agent 302 to forward the transaction back to bus 303. Therefore, agent 304 can behave as the subtractive decode agent on bus 301. Agent 302 uses the MT signal to indicate to agent 304 that the transaction originated on bus 303 and that agent 304, instead of agent 302, should behave as the subtractive decode agent on bus 301 by waiting a finite period of time before claiming the transaction without decoding. Then, if the transaction is targeted to an agent on bus 301, that agent performs a positive decode and claims the transaction on bus 301 in step 511. However, if no agent on bus 301 claims the transaction, then by the process of elimination, the target of the transaction must reside on bus 305. Therefore, in step 513, agent 304 claims the transaction without decoding.

Figure 6:
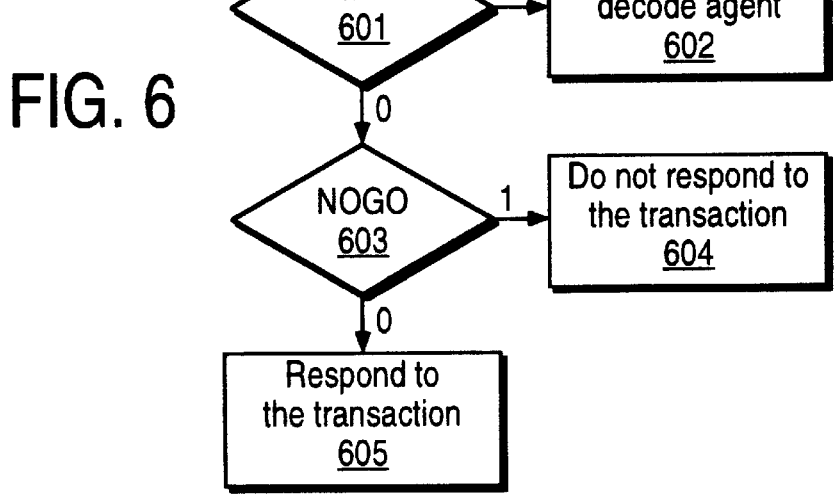
FIG. 6 is a flow diagram illustrating the behavior of one of the subtractive decode agents according to one embodiment of the present invention.

The behavior of agent 304 is illustrated by the flow diagram of FIG. 6. For this illustration, assume that the MT signal is a digital signal that agent 302 drives to '1' when the master is on bus 303, and to '0' when the master is on bus 301. Also assume that NOGO signal is a digital signal that agent 302 drives to '1' when agent 302 is retaining the responsibility to respond to the transaction, and to '0' when agent 302 is transferring the responsibility to respond to the transaction to agent 304. FIG. 6 shows that the NOGO signal might be ignored depending on the value of the MT signal. If the MT signal is '1', then agent 304 always behaves as a subtractive decode agent (block 602). However, if the MT signal is '0', then agent 304 is prevented from claiming the transaction by subtractive decode, and the subsequent behavior of agent 304 depends on the NOGO signal. If the NOGO signal is '1', then agent 304 does not respond to the transaction (block 604). If the NOGO signal is '0', then agent 304 responds the transaction (block 605). If desired, other signal types or encodings can be used.

Figure 7:
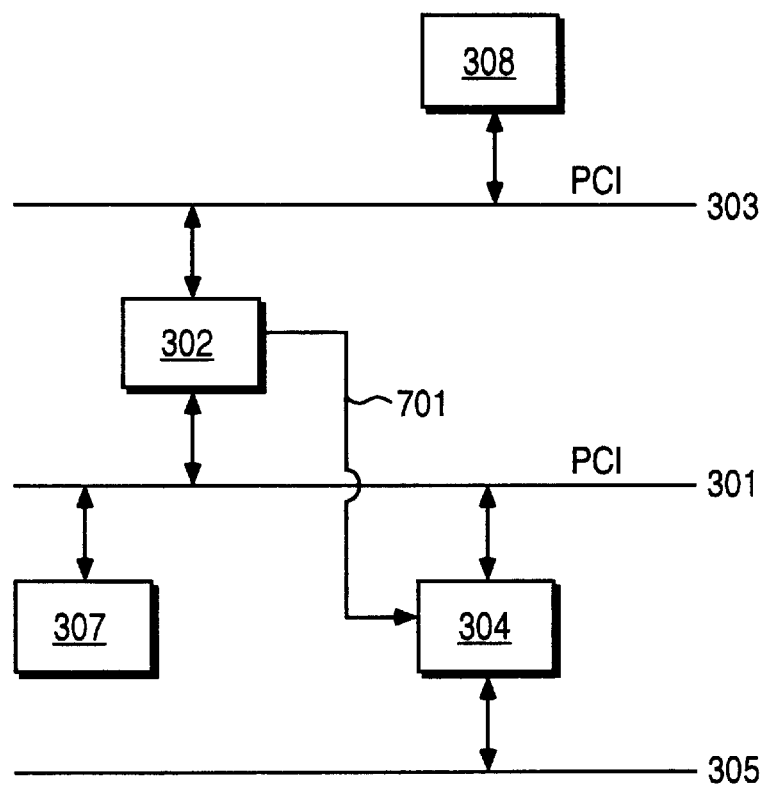
FIG. 7 is a block diagram of the computer system of FIG. 3A wherein the NOGO, MT, and T_ABORT signals share one signal line.
Figure 8:
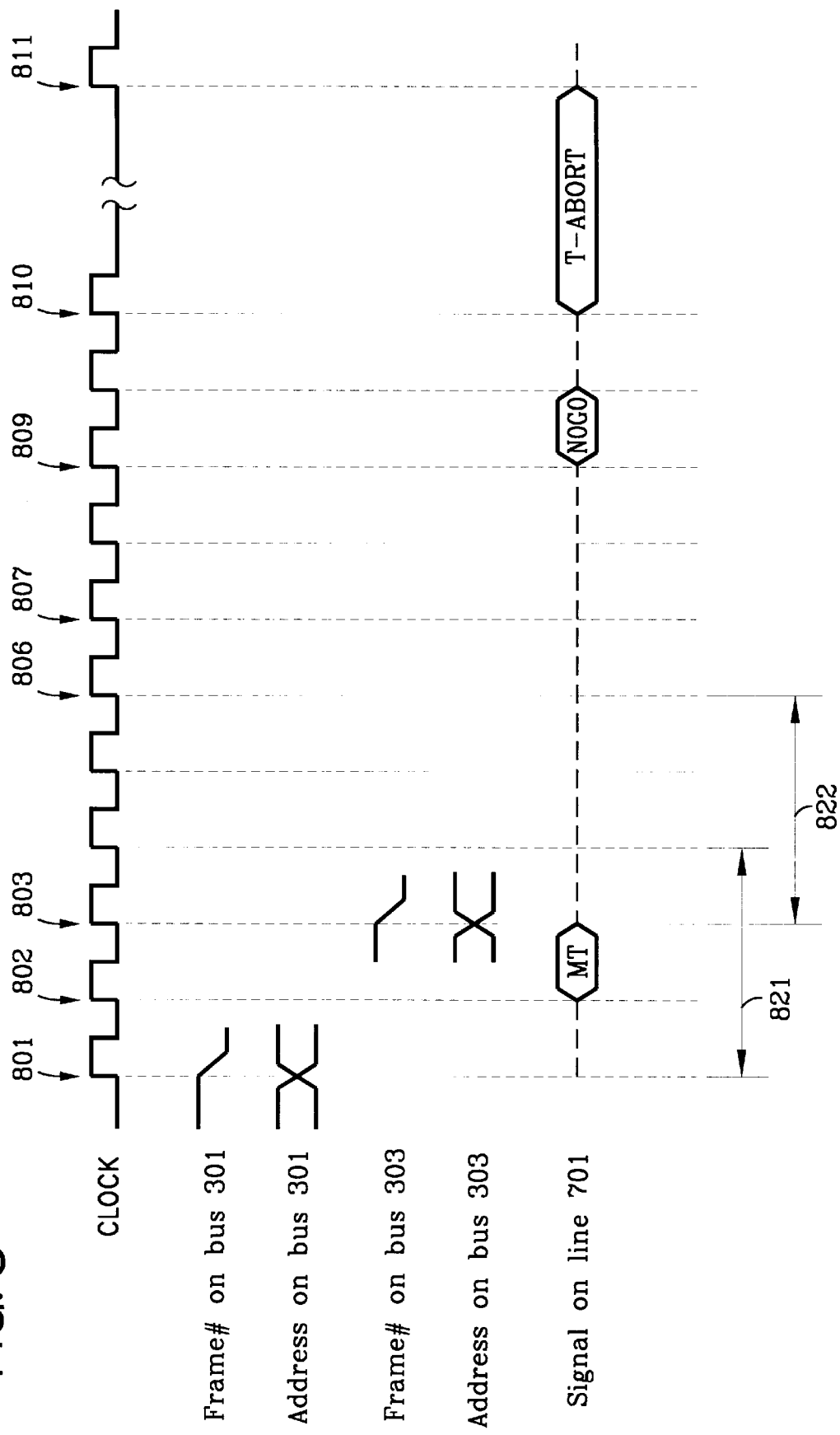
FIG. 8 is a timing diagram illustrating an implementation of the present invention in which the NOGO, MT, and T_ABORT signals are time-multiplexed over one signal line.

Although it is possible to use separate signal lines for the NOGO signal and the MT signal within the scope of the present invention, it is preferable to use one signal line for both signals in order to reduce the pincounts of and the routing between agents 302 and 304. FIG. 7 is a block diagram of the computer system of FIG. 3A wherein the NOGO, MT, and T_ABORT signals share signal line 701. FIG. 8 is a timing diagram illustrating an implementation of the present invention in which the NOGO, MT, and T_ABORT signals are timemultiplexed over signal line 701.

To understand FIG. 8 it is important to understand that, within the scope of the present invention, agent 302 can be implemented in a number of ways. For example, agent 302 can be implemented to pass virtually all signals from one bus to the other with minimum delay. Alternatively, agent 302 can be implemented to select certain transactions on one bus and recreate only those transactions on the other bus. Therefore, the steps, signals, and timings associated with forwarding a transaction from one bus to another would vary according to the implementation of agent 302. Above, to best introduce the use of the NOGO signal and the MT signal, it was assumed that agent 302 forwarded a transaction at the same time that agent 302 claimed the transaction by subtractive decode. However, agent 302 could forward a transaction or pass signals associated with the transaction before or after agent 302 claims the transaction by subtractive decode, or even if agent 302 does not claim the transaction by subtractive decode. For the purposes of FIG. 8, assume that agent 302 passes certain signals, such as the FRAME# signal and the address, before it claims the transaction by subtractive decode. Also, assume that there is a delay of two clock periods from one side of the bridge to the other side of the bridge.

Referring now to FIG. 8 in conjunction with FIG. 7, a transaction is initiated at time 801 by the assertion of the FRAME# signal on bus 301. Also at time 801, the address on bus 301 changes to correspond to the target address of the new transaction. The FRAME# signal and the new address are passed across agent 302, resulting in agent 302 asserting the FRAME# signal and driving the new address on bus 302 at time 803.

At time 802, one clock period after the transaction is initiated, agent 302 drives the appropriate value of the MT signal on signal line 701. Thus, the clock period beginning at time 802 is called the MT window. At the end of the MT window, agent 304 samples the state of the signal line 701 to determine the value of the MT signal.

Signal line 701 is later reused to transfer the NOGO signal. Transfer of the NOGO signal can occur only after it has been determined whether the target resides on either bus 301 or bus 303. Assume that the slowest positive decode agent on either bus requires three clock periods for decoding. Consequently, positive decoding occurs during time period 821 on bus 301 and during time period 822 on bus 303. The last opportunity for a positive decode agent to claim the transaction is during the clock period starting at time 806. Therefore, at time 807, agent 302 determines whether the target is on either bus 301 or bus 303. Then, there is a delay of two clock periods before agent 302 drives the appropriate value of the NOGO signal on signal line 701. Thus, the clock period beginning at time 809 is called the NOGO window. At the end of the NOGO window, agent 304 samples the state of signal line 701 to determine the value of the NOGO signal.

As described above, the MT signal and the NOGO signal are time-multiplexed over signal line 701. The MT window begins one clock period after the transaction is initiated. With a PCI to PCI bridge delay of two clock periods, the NOGO window begins eight clock periods after the transaction is initiated. In general, the NOGO window begins N clock periods after the transaction is initiated, where N is four clock periods plus twice the PCI to PCI bridge delay. Of course, the duration and placement of either window could be varied to accommodate design considerations or a different bus protocol.

Continuing to refer to FIGS. 7 and 8, signal line 701 is also used to time multiplex the T_ABORT signal. In this embodiment, signal line 701 is bi-directional. The T—ABORT signal is only needed when agent 302 transfers the responsibility to respond to agent 304 but retains the responsibility to assert DEVSEL# until the end of the transaction. Assume that at time 809, agent 302 transfers the responsibility to respond to agent 304. At time 810, agent 304 transfers the bus cycle to bus 305. From time 810 until the end of the transaction (time 811), agent 302 samples the T_ABORT signal on signal line 701 for a target abort condition. If a target abort condition is present, then agent 304 asserts the T_ABORT signal to coordinate a target abort condition with agent 302. Agent 302 detects the assertion of the T_ABORT signal on signal line 701. Accordingly, in a predetermined time period(s) (e.g., one, two, etc.) agent 302 deasserts DEVSEL# and agent 304 concurrently asserts STOP#.

Figure 9:
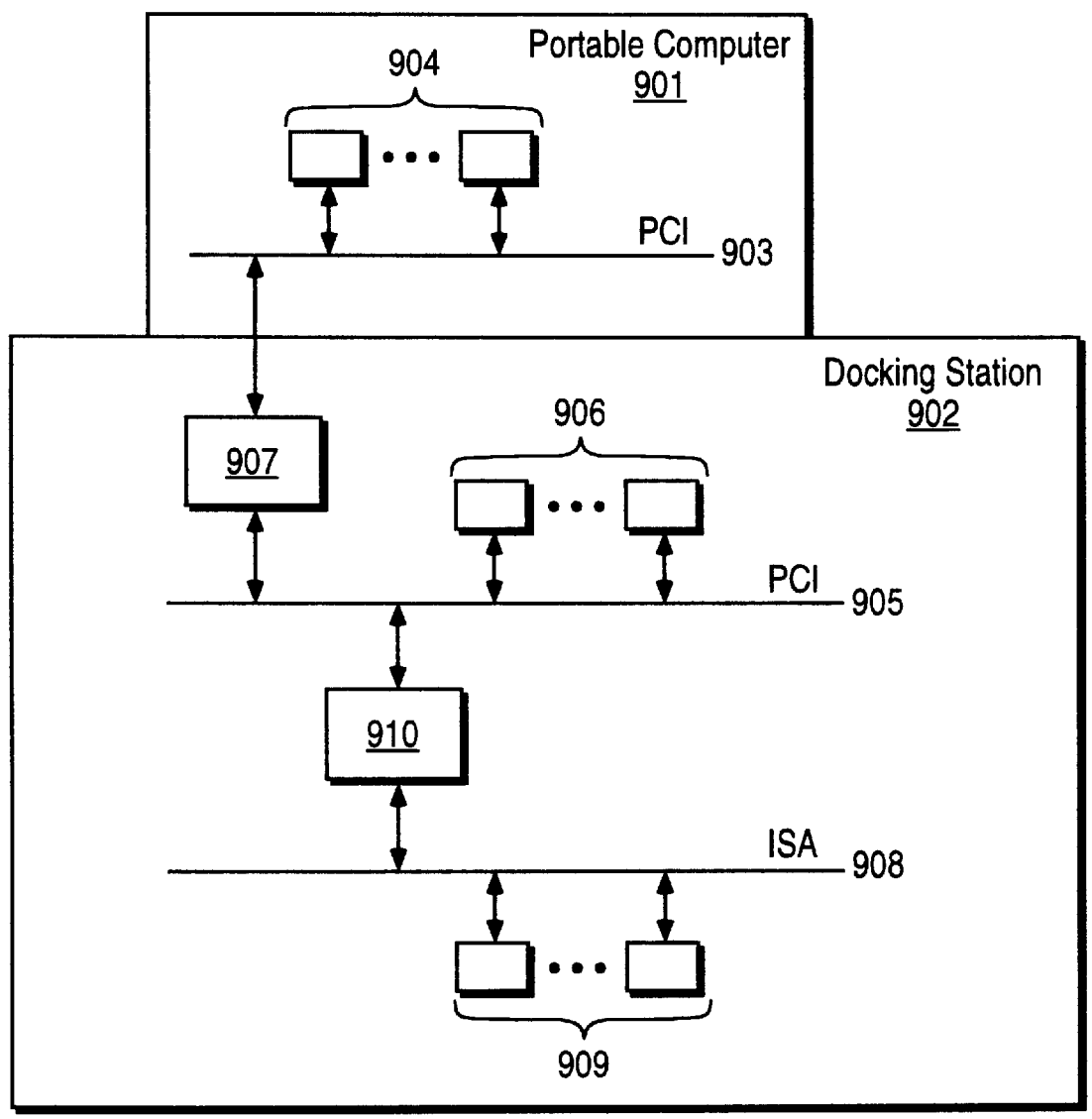
FIG. 9 is a block diagram of one embodiment of the present invention in a portable computer with a docking station.

Thus, the present invention provides for the support of two subtractive decode agents on the same bus. One application of the invention is on a PCI bus in the docking station of a portable computer, as illustrated in FIG. 9. The portable computer 901 has a primary PCI bus 903 populated with a number of agents 904, and the address range of agents 904 encompasses the address space of ISA legacy devices. The portable computer 901 can be docked to a docking station 902 with a secondary PCI bus 905 populated by a number of agents 906 that provide additional resources. The two PCI buses 903 and 905 are connected through PCI to PCI bridge 907. It is desirable to have an Industry Standard Architecture (ISA) bus 908 in docking station 902 to provide support for a number of ISA legacy devices 909. Consequently, there would be two bus bridges on the secondary PCI bus 905, bridge 907 to the primary PCI bus 903 and bridge 910 to ISA bus 908. The address spaces behind these two bridges would be overlapping, fragmented, and possibly dynamic. Therefore, it is advantageous to implement both bridges as subtractive decode agents using the present invention.

What is claimed is:

1. A computer system comprising:
   a first bus including a first signal line and a second signal line;
   a third signal line;
   a first agent coupled to said first bus and said third signal line, said first agent claiming to be a target of a transaction on said first bus without decoding an address associated with the transaction by asserting a first signal on said first signal line; and
   a second agent coupled to said first bus and said third signal line, said second agent responding to the transaction as the target and thereafter asserting a third signal on said third signal line to coordinate deassertion of said first signal on said first signal line by said first agent and concurrent assertion of a second signal on said second signal line by said second agent.

2. The computer system of claim 1 wherein said first signal comprises a DEVSEL# signal and said second signal comprises a STOP# signal.

3. The computer system of claim 1 further comprising a fourth signal on a fourth signal line from said first agent to prevent said second agent from claiming to be the target of the transaction.

4. The computer system of claim 1 further comprising:
   a fifth signal on a fifth signal line from said first agent to signal said second agent to respond to the transaction.

5. The computer system of claim 4 wherein said fourth signal and said fifth signal are time-multiplexed on said fourth signal line.

6. The computer system of claim 4 wherein said third, fourth, and fifth signals are time-multiplexed on said third signal line.

7. The computer system of claim 1 further comprising a third agent that initiates the transaction.

8. The computer system of claim 1 wherein said first agent comprises a first bridge to a second bus.

9. The computer system of claim 8 wherein said second agent comprises a second bridge to a third bus.

10. The computer system of claim 1 wherein said first bus comprises a first PCI bus.

11. The computer system of claim 10 wherein said first agent comprises a first bridge to a second PCI bus.

12. The computer system of claim 11 wherein said second agent comprises a second bridge to an ISA bus.

13. The computer system of claim 12 wherein said first PCI bus is in a docking station and said second PCI bus is in a portable computer.

14. The computer system of claim 13 wherein said ISA bus is in said docking station.

15. A method of splitting a bus target response of a transaction initiated on a first bus between two devices, the method comprising:
   claiming to be the target of the transaction by a first agent on the first bus;
   transferring responsibility to respond to the transaction from said first agent to a second agent; and
   signaling from said second agent to said first agent to target abort the transaction.

16. The method of claim 15 further comprising said first agent waiting a finite period of time for an agent of the first bus to claim the transaction prior to said first agent claiming the transaction.

17. The method of claim 15 wherein prior to transferring responsibility to respond, the method comprises:
   said first agent forwarding the transaction to a second bus; and
   said first agent waiting a finite period of time for an agent to claim the transaction on said second bus by decoding the address associated with the transaction.

18. The method of claim 15 further comprising said first agent signaling said second agent to prevent said second agent from claiming the transaction prior to said first agent claiming the transaction.

19. The method of claim 18 wherein a signal to transfer the responsibility to respond is time-multiplexed with a signal to prevent the second agent from claiming the transaction.

20. A computer system comprising:
   a first bus including a first signal line and a second signal line;
   a first agent coupled to said first bus, said first agent claiming to be a target of a transaction on said first bus without decoding an address associated with the transaction by asserting a first signal on said first signal line, said first agent transferring responsibility to respond, wherein said first agent is capable of target aborting the transaction prior to said first agent transferring the responsibility to respond by deasserting said first signal on said first signal line and concurrently asserting said second signal on said second signal line; and
   a second agent coupled to said first bus, said second agent responding to the transaction as the target, said second agent is capable of target aborting the transaction after said first agent transfers the responsibility to respond by deasserting said first signal on said first signal line and concurrently asserting said second signal on said second signal line.

21. The computer system of claim 20 wherein said first signal comprises a DEVSEL# signal and said second signal comprises a STOP# signal.

22. A computer system, comprising:
   a first bus;
   a first agent coupled to the first bus that claims to be a target of a transaction on the first bus without decoding an address associated with the transaction; and
   a second agent coupled to the first bus, the second agent responding to the transaction as the target if the first agent indicates that the second agent is to respond, the second agent thereafter indicating to the first agent to coordinate initiation of a target abort condition.

23. The computer system of claim 22 wherein the first agent claims to be the target of the transaction on the first bus without decoding the address associated with the transaction by asserting a first signal on a first signal line.

24. The computer system of claim 23 wherein the first agent asserts a second signal on a second signal line to the second agent to respond to the transaction as the target.

25. The computer system of claim 23 wherein the second agent coordinates initiation of a target abort condition by asserting a second signal on a second signal line to cause the first agent to deassert the first signal on the first signal line and the second agent to concurrently assertion a third signal on a third signal line.

26. The computer system of claim 25 wherein the first signal comprises a DEVSEL# signal and the third signal comprises a STOP# signal.

* * * * *